UNITED STATES PATENT OFFICE.

CARTER WHITE AND JOHN WILLIAM PATTERSON, OF LONDON, ENGLAND.

MANUFACTURE OF WHITE LEAD.

1,163,052.          Specification of Letters Patent.      Patented Dec. 7, 1915.

No Drawing.      Application filed August 10, 1912. Serial No. 714,380.

*To all whom it may concern:*

Be it known that we, CARTER WHITE and JOHN WILLIAM PATTERSON, subjects of the King of Great Britain and Ireland, both residing at 121 Grosvenor Park, London, England, have invented new and useful Improvements in or Relating to the Manufacture of White Lead, of which the following is a specification.

This invention relates to the manufacture of white lead, and its object is to provide a process whereby a product of high density and great covering power can be obtained economically and with a good yield.

Many attempts have been made to replace the old Dutch process by more rapid processes. The idea underlying the more recent of these processes is to employ a solution of lead salt, for example basic acetate of lead, and to precipitate basic carbonate by addition of a suitable reagent (alkali metal carbonate or carbonic acid).

A white lead to be capable of competing with the ordinary commercial product of the long and expensive Dutch process must contain at least 25-30 per cent. of lead hydroxid, otherwise it does not possess the necessary degree of density and covering power necessary for its practical employment in place of the more expensive product. I have found that a white lead having the necessary density and covering power can be obtained by the coöperation of three definite conditions, all of which are of essential importance, namely:—1. The white lead must be precipitated from a solution of acetate of lead of greater or less basicity saturated with litharge; 2. It must be precipitated at about boiling temperature; 3. The precipitating agent must be solid calcined soda or soda ash, hereinafter included in the term calcined soda.

The process of the present invention is based upon the joint employment of these three measures.

Solutions of basic acetate of lead containing a large percentage of lead oxid in solution can be obtained by heating or boiling a solution of basic acetate of lead together with the oxid of lead, and adding further quantities of oxid of lead if required to attain saturation, as boiling enables such solutions to take up further quantities of the oxid. When solutions are used in which such large quantities of lead oxid have been dissolved, a proportion of bicarbonate of soda should be added after the basic carbonate of lead has been precipitated from the boiling solution, in order to prevent the tendency of the product to become discolored. We may add bicarbonate of soda in any case if a tendency is noticed for the precipitate to become discolored when the carbonate is added to precipitate the white lead from the solution.

Example 1: Lead in a granulated or finely divided form is placed in a tank and covered with a weak solution of acetic acid (of 6 per cent. strength for example) and is left for 2 to 4 hours. The solution is then drawn off and the lead allowed to oxidize by contact with the air for say 2 to 4 hours. The solution is again added to dissolve the lead oxid already formed and more lead. The steps of submitting the lead to the solution, drawing off the solution, and exposing the lead to the air, are repeated until a total period of say 24 hours, or longer if necessary has elapsed. The procedure may be shortened by heating the solution in contact with the lead in the tank during the periods in which the lead is subjected to the action of the solution as above explained. Lead oxid (litharge) is then added to the solution and well stirred so as to render the solution saturated with lead oxid. The solution is allowed to settle and is decanted or filtered. The clear solution is heated to boiling temperature or approximately so, and carbonate of soda in the form of soda ash is then added, preferably in slight excess and all at once, so as to precipitate the whole of the lead. The mixture is kept stirred during the precipitation of the lead, and may be kept boiling for a short time longer if necessary. If, after the addition of the soda ash to the solution, a tendency is noticed for the precipitate to become discolored, this can be obviated by the addition of a small quantity of bicarbonate of soda, for example about 1/10th. the weight of the soda ash. The precipitate is washed to free it from sodium acetate and then pressed and dried. We find that excellent results are attained if the solution after addition of the lead oxid has a specific gravity of about 1.2 before boiling previous to the precipitation. This may be attained for instance by using a 10 per cent. solution of acetic acid for the initial dissolution of the lead, and subsequently diluting the solution after addition of the lead oxid, to about 1.2 sp. gr. before boiling.

Example 2: A solution of basic acetate of lead is prepared by submitting metallic lead to the action of dilute acetic acid and air alternately, according to Example 1. The solution is raised to boiling temperature, and litharge is added until the solution will take up no more. The solution is then further heated as in Example 1, but when the carbonate of soda is added to the basic acetate of lead solution containing the large proportion of lead oxid, a suitable proportion of bicarbonate of soda, say about one-tenth the weight of the carbonate, should be added.

It is to be understood that the working details and proportions indicated above are given by way of example and may be varied within certain limits.

The sodium acetate produced in the process can be recovered either by crystallizing it from the filtrate and washing, or by evaporating the liquors to dryness and distilling with an acid, for instance sulfuric or hydrochloric acid, to reproduce acetic acid.

What we claim and desire to secure by Letters Patent is:—

1. Process for the manufacture of white lead, consisting in adding calcined soda to an approximately boiling solution of basic acetate of lead saturated with litharge, substantially as described.

2. Process for the manufacture of white lead, consisting in adding calcined soda all at once to an approximately boiling solution of basic acetate of lead, saturated with litharge, substantially as described.

3. Process for the manufacture of white lead, consisting in adding calcined soda to an approximately boiling solution of basic acetate of lead, and after precipitation of the white lead adding bicarbonate of soda substantially as and for the purpose described.

In testimony whereof we have signed our names to this specification in the presence of two subscribing witnesses.

CARTER WHITE.
JOHN WILLIAM PATTERSON.

Witnesses:
CARRICK HOWE,
ROBERT MILTON SPEARPOINT.

Copies of this patent may be obtained for five cents each, by addressing the "Commissioner of Patents, Washington, D. C."